(12) United States Patent  
Verbana

(10) Patent No.: US 7,263,297 B2  
(45) Date of Patent: Aug. 28, 2007

(54) METHOD AND DEVICE FOR THE CONTROL OF THE POWER RADIATED ONTO A TRANSMISSION TELESCOPE IN FREE-SPACE LASER TELECOMMUNICATIONS SYSTEMS

(75) Inventor: Gianfranco Verbana, Vimercate (IT)

(73) Assignee: Alcatel, Paris (FR)

( * ) Notice: Subject to any disclaimer, the term of this patent is extended or adjusted under 35 U.S.C. 154(b) by 662 days.

(21) Appl. No.: 10/686,572

(22) Filed: Oct. 17, 2003

(65) Prior Publication Data

US 2004/0120718 A1   Jun. 24, 2004

(30) Foreign Application Priority Data

Oct. 18, 2002   (IT)   ............................ MI2002A2211

(51) Int. Cl.  
*H04B 10/04*   (2006.01)
(52) U.S. Cl. ........................ 398/201; 398/164; 398/171
(58) Field of Classification Search ........ 398/163–164, 398/168–171, 201  
See application file for complete search history.

(56) References Cited

U.S. PATENT DOCUMENTS 3,972,582 A * 8/1976 Oosaka et al. .............. 369/103

5,065,455 A   11/1991 Ito et al.  
5,442,487 A * 8/1995 Mizuno ....................... 359/784  
6,104,478 A * 8/2000 Giggenbach ................ 356/140  
7,078,719 B2 * 7/2006 Pirinoli ................... 250/559.36

FOREIGN PATENT DOCUMENTS

JP   2001 292105 A   10/2001

* cited by examiner

*Primary Examiner*—Dzung Tran  
(74) *Attorney, Agent, or Firm*—Sughrue Mion, PLLC

(57) ABSTRACT

A variable beam divergence FSO optical transmitter is described, as well as a method for altering the transmission power being radiated in a telescope for laser on air telecommunications systems. The method calls for the transmission of a very wide angle of the laser beam, in any case sufficient to ensure the quality of the link, when the level of atmospheric attenuation is at a minimum (good visibility conditions) and for a reduction of the beam, in a linear way, in order to increase the density of the power transmitted when visibility becomes poor (increase in atmospheric attenuation due to mist or fog). To increase or decrease the divergence of the beam, the distance between the source of light and the lens is altered in a suitable manner. After evaluating the extent of the variation due to atmospheric attenuation, arrangements are made to alter to a suitable extent the angle of the laser beam that is radiated.

12 Claims, 2 Drawing Sheets

Figure 1:
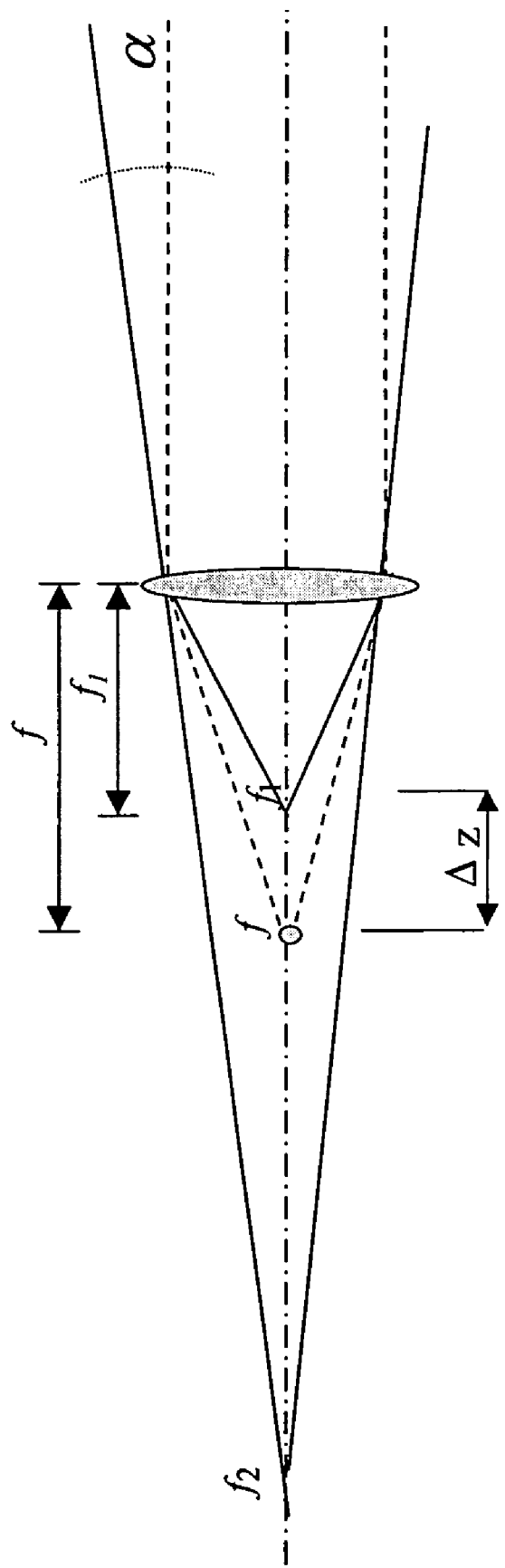

METHOD AND DEVICE FOR THE CONTROL OF THE POWER RADIATED ONTO A TRANSMISSION TELESCOPE IN FREE-SPACE LASER TELECOMMUNICATIONS SYSTEMS

DESCRIPTION

This invention concerns the field of wireless point-to-point optical telecommunications systems. In particular it concerns a method and a device for altering the density of the power radiated by an optical transmission system.

Wireless optical transmission systems for transmitting a light signal on air are known. Operation of optical systems of this type, for transmitting a modulated light signal on air, is based fundamentally on one or more lasers coupled to one or more lenses (transmission side) and of one or more lenses capable of focussing the laser beam incident on the sensitive surface of the detector (receiving side).

In traditional radio transmission systems, the level of power transmitted is easily altered by adjusting the polarisation of the transistor or Gasfet of the power amplifier.

In optical transmission systems, on the contrary, the laser has to work at a fixed power due to its intrinsic qualities. In other words, it is not possible to alter the output power of the lasers without affecting also other important features such as, for example, the work point.

It is also known that the dynamics of optical receivers are very much less than in radio systems; in particular, photodiodes do not tolerate high levels of received power (<−10 dBm). Attenuation due to atmospheric conditions varies from 0.2 dB/Km (in good weather, i.e. "blue sky") to over 50 dB/Km (in moderate fog). It is obvious that the level of power received will saturate the receiver in optimum atmospheric conditions.

It would therefore be desirable to equip free-space optical transmission systems with a device, preferably an automatic device, capable of lowering the power transmitted by the laser when it is not required, that is to say in optimum atmospheric conditions and therefore when there is no strong attenuation. Ideally, it would be desirable to equip free-space optical transmission systems with an automatic system for controlling the transmitted power ATPC of the known type for traditional radio systems.

Current wireless optical systems, however, have a fixed output power. In the design stage, depending on the wavelength of the link to be set up, a given type of laser is defined, and this in turn provides a certain output power (fixed, as already stated above). The cost of the system and its type also varies, obviously, depending on the type of laser installed.

The main aim of this invention is to solve the problems referred to above and to provide a method and a transmitter capable of varying the level of radiated power in a transmitting telescope in laser on air telecommunications systems.

A further aim of this invention is to provide a method and a transmitter capable of controlling the radiated power by acting on the transmission telescope in such a way as to create automatic control of the power being transmitted, similar to a typical ATPC used in traditional radio systems.

Yet another aim of this invention is to provide an FSO telecommunications system far tougher than traditional systems as far as concerns sighting, with a wide transmission beam in fine weather (for most of the time), without requiring the use of autotracking or other similar devices.

These and other aims are achieved with the transmitter according to claim 1 and with the method according to claim 9. Further advantageous features of the invention are indicated in their respective dependent claims. All the claims are understood to be integral parts of this description.

The idea underlying this invention is to transmit a beam with a very wide angle, sufficient to guarantee the quality of the link and to make the stability of sighting less critical when the conditions of visibility are good; according to this invention, the beam transmitted is reduced in a linear fashion when the visibility becomes lower (due to mist, fog, rain, and so on).

Figure 2:
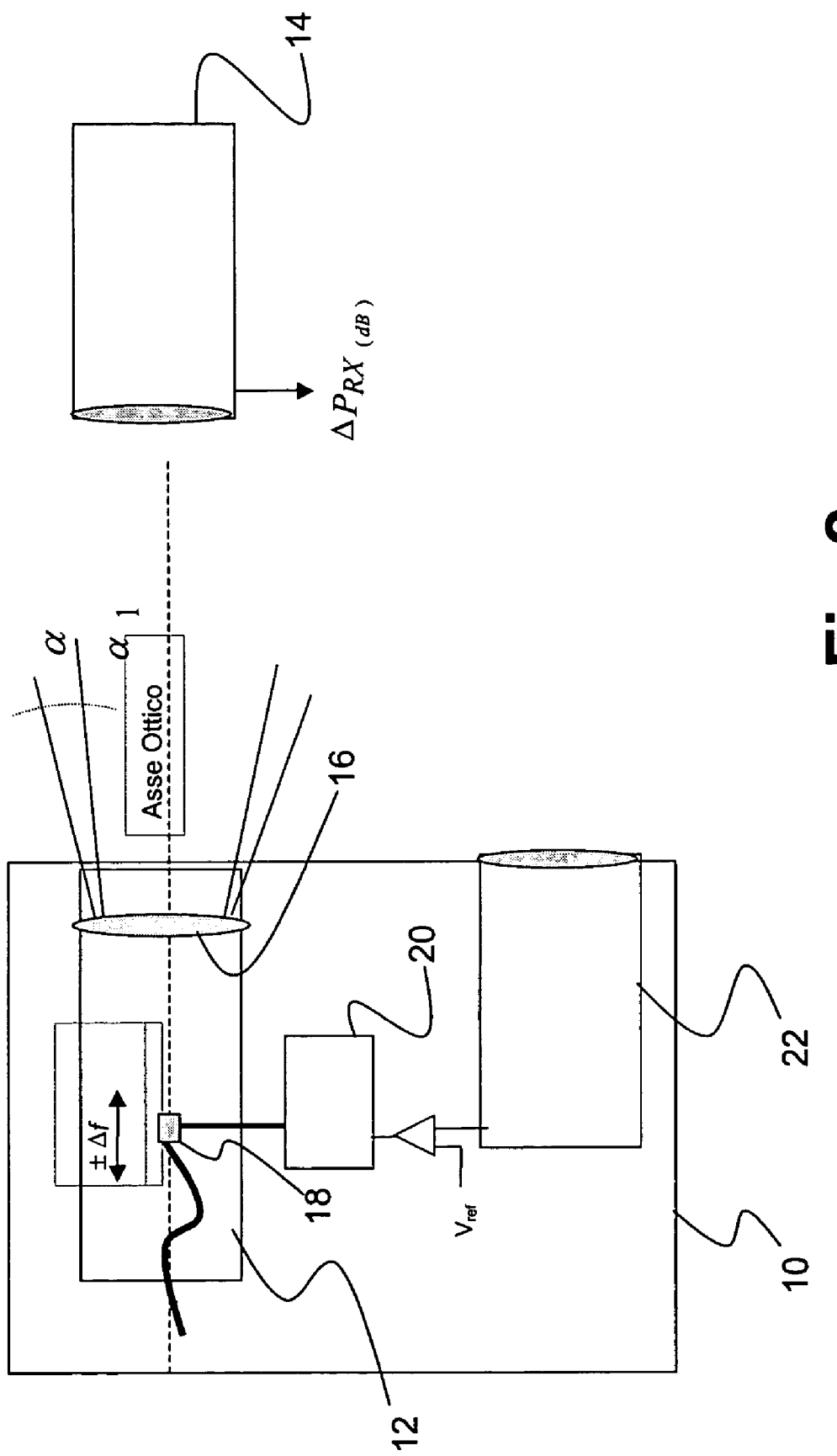

This invention will certainly become clear in the detailed description provided below by way of example only and not constituting a limitation, and which should be read with reference to the attached plates of drawings, in which:

FIG. 1 shows schematically how a laser beam appears depending on the position of the source of light in relation to a convergent lens; and FIG. 2 shows schematically free-space optical communications system according to this invention.

The transmission side of a transceiver according to the state of the art for a FSO (Free Space Optics) system general includes a source of light (laser or optical fibre termination) and a convergent lens located at a given fixed distance from the source of light.

The transmission power of known FSO systems is fixed, and the angle of emission is also fixed. There is, in any case, a maximum power limit beyond which, for reasons of cost and safety, it is not possible to increase the power budget of the link.

It is possible to obtain a considerable increase by increasing the directivity of the laser beam, decreasing the angle of the beam being transmitted. By imposing constraints on the mechanical structure supporting the system, the practical limit of the minimum angle of the beam is about 3 mrads. By imposing strict design limits on the structure, it is possible to reach 1.5 mrads. Possibly, thanks to complicated and expensive tracking systems, it is possible to reach a minimum angle of the beam of 0.3-0.5 mrads.

It is therefore essential, in a wireless optical system, in order for it to function correctly, to ensure that the optical components of the transmission side and those of the receiving side are perfectly aligned so as not to introduce any additional losses into the signal to be transmitted.

Obviously, the wider the angle of the beam transmitted is, the less critical the positioning structure of the optical transceiver will be. However, under the same conditions of distance covered by the link, the losses will be greater and, in the same atmospheric conditions, the maximum distance over which the link can be installed will be shorter.

In any case, as stated above, in all known systems the angle of the beam transmitted is fixed beforehand.

This invention is based on the idea of transmitting a very wide angle, sufficiently wide to ensure the quality of the link, that is to say to make sure that the stability of the sighting is not highly critical when the conditions of visibility are good; however, this invention calls for the angle of the beam transmitted to be made smaller, in a linear way (that is to say to an extent proportional to the worsening of the environmental conditions) when visibility becomes poorer (due to the presence of mist, fog, and so on). In practice, the angle of the transmission beam is a function of the level of the field received.

Generally, changes in visibility take place gradually rather than suddenly. It is therefore not necessary to provide means for changing the width of the beam rapidly. It is in any case essential to acquire information concerning the weather conditions and in particular concerning the level of the field being received. In bidirectional FSO links, the information concerning the level of the field being received can be obtained from the local receiver, since the type of fading is always flat.

It is in any case possible to use the information from the corresponding remote receiver in the event that, for other reasons (for creating service or monitoring channels) a dispersed spectrum 2.5 GHz 2 Mb/s radio beam (free licences) is used in parallel to the optical beam.

In any case, the quality of the signal transmitted is ensured as long as the level of the signal being received is higher than the threshold level of the receiver.

Each time the signal received decreases due to atmospheric problems (rain, snow or fog), the transmission power is increased by reducing the angle of the beam being transmitted.

With reference to FIG. 1, by positioning the source of light (laser or termination of an optical fibre) on the focal point (f) of a convergent lens a collimated beam (very small almost non-existent angle, imposed only by the diffraction limit) is obtained.

If the source of light is brought closer to the lens or the lens is brought closer to the source, a diverging spherical wave is produced as if it were emitted by a virtual focus $f_2$.

If $f$ is the distance between the focal point and the convergent lens, $f_1$ is the distance between a generic point of light emission and the convergent lens (closer than $f$, that is to say $f_1 < f$), $\Delta f$ is the difference between $f$ and $f_1$, and D is the diameter of the convergent lens, then it is possible to calculate the angle $\alpha$ of divergence of the beam using the formula given below. This is because the lens appears as a diaphragm of the spherical wave. On applying the equations of geometrical optics, it is found that the angle of the beam is a function of: diameter and focal point of the lens (fixed due to other considerations taken into account in design) and of the distance $\Delta f$ that is to say how far forward one is as compared with the focal point.

$$\alpha = \frac{D \cdot \Delta f}{f^2}$$

By keeping the source fixed and moving the transmission lens along the optical axis (normally having a diameter of between 2 and 5 cm) we obtain the variable angle of the beam. Of course, the same results can be achieved by keeping the lens fixed and moving the source towards the lens itself (in order to increase the angle $\alpha$) or by bringing the source towards the focal point, as indicated in FIG. 2.

FIG. 2 shows a transceiver 10 that includes a transmitter 12 according to this invention. Opposite to the transceiver 10, or better, opposite to its transmitter 12, there is a remote receiver 14 for forming an FSO transmission system.

The transmitter 12 includes a convergent lens 16 and means 18 for generating light, in the form of a laser or of an optical fibre termination. The convergent lens has a focal point at a focal distance $f$ from the lens, calculated along the optical axis. The means 18 for generating light are at a source distance $f_1$ from the lens, again calculated along the optical axis. According to the invention, means 20 are provided for changing the source distance $f_1$. Conveniently, these means 20 may be linear motors or stepping motors or transducers.

The motion of the means 18 for generating light takes place responsive to information concerning the level of received power supplied by a local optical receiver 22 of the transceiver 10.

By reducing the source distance (source closest to the lens), the divergence angle $\alpha$ of the beam increases (the beam becomes wider and its power density decreases) passing from $\alpha 1$ to $\alpha$. The difference in gain, in dBs, is $\Delta \text{Gain} = 20 \log \alpha / \alpha 1$, which is equal also to the difference in power.

Conveniently, the relative movement of the lens in respect of the focus can be achieved by means of one or more linear motors and one or more worm screws. As an alternative, considering the light weight of the object to be moved and the short distances to be covered, it is possible to use components that are readily available on the market, such as magnetic transducers or other similar devices.

At this point, the main advantages of the invention are clear. In the first place, the invention solves the problem of the maximum level tolerated by the optical receiver. Indeed, even using a laser with a fixed power higher than that which might be necessary in order to establish an optical link of a certain length in optimum weather conditions, the power received is reduced by widening the angle of the transmission beam (reducing the distance between the focus and the lens).

Furthermore, this invention eliminates all the periodical maintenance problems relating to realignment that are typical of systems that have fixed transmission angles.

This invention also improves the safety of FSO transmission systems and possibly enables them to be used even in areas subjected to specific restrictions in terms of the level of power. In other words, for most of the year (in favourable climatic conditions), the density of transmitted power is considerably reduced since a wide beam is being transmitted.

The invention claimed is:

1. A transmitter for Free Space Optical transmission systems, the transmitter including: at least one convergent lens having a corresponding focal point located at a focal distance ($f$) from the convergent lens along an optical axis; and at least one source of light situated behind the convergent lens in order to produce a beam of light carrying a signal to be transmitted on air, the at least one source of light being situated at a source distance ($f_1$) from the convergent lens, and means for changing the source distance ($f_1$) for changing the angle of divergence ($\alpha$) of the beam of light in a corresponding manner, characterized in that said means for changing the source distance ($f_1$) are operable so as to maintain a wide angle of divergence ($\alpha$) in good visibility conditions of the link, namely in conditions that are sufficient to guarantee the quality of the link, and to reduce the angle of divergence ($\alpha$) proportionally to worsening of environmental conditions along the link.

2. A transmitter according to claim 1, characterised in that said means for changing the source distance ($f_1$) include means capable of reducing the source distance ($f_1$) so as to increase in a corresponding manner the angle of divergence of the beam of light and means capable of increasing the source distance ($f_1$) so as to decrease or substantially cancel out the angle of divergence.

3. A transmitter according to claim 1, characterised in that said means for changing the source distance ($f_1$) are responsive to information concerning the level of power received by a local optical receiver.

4. A transmitter according to claim 1, characterised in that said means for changing the source distance ($f_1$) include one or more stepping motors and one or more worm gears.

5. A transmitter according to claim 1, characterised in that said means for changing the source distance ($f_1$) include magnetic transducers.

6. A transmitter according to claim 1, characterised in that said at least one source of light includes a laser light source or an optical fibre termination.

7. A transceiver for Free Space Optical (FSO) transmission systems, characterised in that it includes one or more transmitters according to claim 1.

8. A Free Space Optical (FSO) transmission system, characterised in that it includes at least two transceivers according to claim 7.

9. A method for providing, in a transmitter for Free Space Optical transmission systems, a variable-divergence laser beam, said method including the following steps: providing at least one convergent lens having a corresponding focal point situated at a focal distance ($f$) from the at least one convergent lens along an optical axis; providing at least one source of light situated behind the at least one convergent lens for producing a beam of light carrying a signal to be transmitted on air, the at least one source of light being situated at a source distance ($f_1$) from the at least one convergent lens, and changing the source distance ($f_1$) in order to alter the angle of divergence ($\alpha$) of the beam of light in a corresponding manner, characterized in that said step of changing the source distance ($f_1$) is carried out so as to maintain a wide angle of divergence ($\alpha$) in good visibility conditions of the link, namely in conditions that are sufficient to guarantee the quality of the link, and to reduce the angle of divergence ($\alpha$) proportionally to worsening of environmental conditions along the link.

10. A method according to claim 9, characterised in that the step of changing the source distance ($f_1$) includes the step of shortening the source distance ($f_1$) in order to increase the angle of divergence ($\alpha$) of the beam of light in the corresponding manner.

11. A method according to claim 9, characterised in that the step of changing the source distance ($f_1$) takes place in response to information concerning the level of power received from a local optical receiver.

12. A method according to claim 9, characterized in that the step of changing the source distance ($f_1$) includes the step of increasing the source distance ($f_1$) in order to decrease or substantially cancel out the angle ($\alpha$) of divergence.

* * * * *